United States Patent [19]
Green et al.

[11] Patent Number: 5,461,822
[45] Date of Patent: Oct. 31, 1995

[54] FLY-CATCHER WITH BAIT

[76] Inventors: Charlie W. Green, 1115 N. Brace Rd., Summertown, Tenn. 38483; Paul R. Jaco, 2921 Featherston Ave., Wichita Falls, Tex. 76308

[21] Appl. No.: 247,929

[22] Filed: May 23, 1994

[51] Int. Cl.$^6$ .................................................. A01M 1/02
[52] U.S. Cl. ............................................... 43/122; 43/107
[58] Field of Search ............................. 43/107, 122, 121

[56]  References Cited

U.S. PATENT DOCUMENTS

| | | | |
|---|---|---|---|
| 4,217,722 | 8/1980 | McMullen | 43/121 |
| 4,217,723 | 8/1980 | Hrebec | 43/122 |
| 4,551,941 | 11/1985 | Schneidmiller | 43/122 |
| 4,794,724 | 1/1989 | Peters | 43/122 |
| 5,243,781 | 9/1993 | Carter | 43/122 |
| 5,309,668 | 5/1994 | Barton | 43/122 |
| 5,342,618 | 8/1994 | Leonhardt | 43/122 |

FOREIGN PATENT DOCUMENTS

| | | | |
|---|---|---|---|
| 0835701 | 12/1938 | France | 43/122 |
| 0000030 | 9/1949 | Philippines | 43/122 |
| 0298750 | 10/1928 | United Kingdom | 43/107 |

Primary Examiner—P. Austin Bradley
Assistant Examiner—James Miner

[57] ABSTRACT

A trap for catching flies having a cylindrical clear plastic outer shell with a removable lid and an opening in the bottom is disclosed.

A funnel-shaped entryway within the cylindrical outer shell. The space between the funnel-shaped entry and the outer shell is filled with bait for attracting flies. A piece of string is glued or otherwise affixed to the inside of the small end of the funnel and dangles below the trap to form a "landing platform" for the flies to alight and crawl into the baited chamber where they become trapped and die.

The lid can be removed for easy cleaning and refilling with bait.

Attachment means are provided at the upper end of the trap where a piece of wire or string can be attached to hang the trap.

The bait includes honey, milk, and diced apple.

1 Claim, 1 Drawing Sheet

FLY-CATCHER WITH BAIT

BACKGROUND OF THE INVENTION

This invention relates to insect traps and specifically to baited traps for flies, We first came up with the idea of a fly catcher from a three liter plastic soft drink bottle. We then came up with the ingredients for the bait which consists of three parts honey, one part milk, and one part diced apple. We field tested our fly trap the entire summer of 1993 and found that it worked exceptionally well.

We also learned that our fly catcher needed to be larger to accommodate dairy farmers and cattle raisers.

We feel that our fly catcher improves the present existing fly traps by being made of clear plastic, having an easy removable top, and having a landing strip for flies to land on and enter the baited chamber.

The bait uses no poisons or pesticides which makes it environmentally safe. Our fly bait gives off no offensive odors. Our fly catcher will make it possible to use less poisons and pesticides around cattle and other farm animals.

Our fly catcher can be hung in the home, barn, feed shed, and eating establishments.

DESCRIPTION OF PRIOR ART

Listed below is a list of patent numbers which relate to fly traps and other insect traps which resemble ours: U.S. Pat. No. 5,243,781 Date: Sep. 14, 1993, U.S. Pat. No. 4,638,592 Date: Jan. 27, 1987, U.S. Pat. No. 4,551,941 Date: Nov. 12, 1985, U.S. Pat. No. 4,476,647 Date: Oct. 16, 1984, U.S. Pat. No. 4,217,723 Date: Aug. 19, 1980, U.S. Pat. No. 3,820,273 Date: Jun. 28, 1974, U.S. Pat. No. 882,306 Date: Mar. 17, 1908, U.S. Pat. No. 307,016 Date: Oct. 21, 1884.

SUMMARY OF THE INVENTION

It is our intention to provide a fly catcher for controlling flies which is environmentally safe and easy to use. The fly catcher is basically a bottle made of clear plastic, with a screw on/off lid, with an inverted funnel-shaped entryway in the bottom, with a piece of string glued or otherwise affixed to the inside of the small hole of the funnel-shaped entryway to hang beneath the fly catcher for flies to alight, with a mixture of honey, milk, and diced apple used as bait to attract flies. Attachments are placed on either side for hanging the fly catcher overhead.

BRIEF DESCRIPTION OF DRAWINGS

The present invention will be more fully understood by reference to the following detailed description, when read in conjunction with the attached drawing, and wherein.

DETAILED DESCRIPTION OF THE INVENTION

Figure 1A:
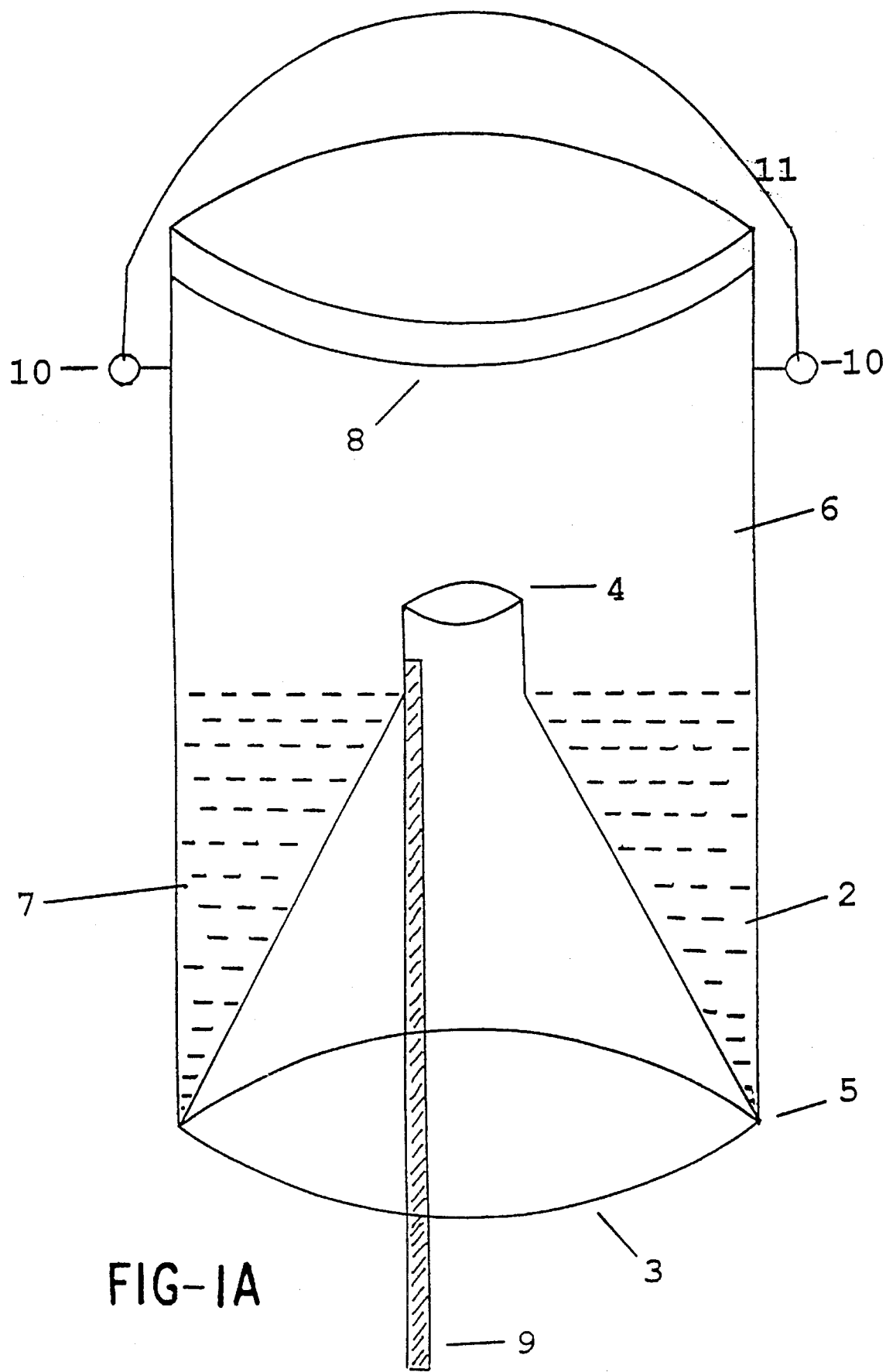
FIG. 1A is a drawing of the preferred embodiment of the fly catcher.

Preferred embodiment of the fly catcher FIG. 1A shows a baited chamber (2) closed at one end with a funnel-shaped entry at the other end (3). The funnel-shaped entry (3) is arranged with the narrow end of the funnel (4) pointed inward toward the non-baited end of the chamber (6). The outward, wider end of the funnel (3) flares out to Join the outer wall (5) of the chamber (6). The width of the funnel opening at its widest thus approximates the inner diameter of the chamber (6). Liquid or semi-liquid bait (7) is placed in the bottom of the trap in the space between the funnel and the outer wall of the trap chamber. The screw on/off lid (8) forms the closed end of the chamber. Removal of the lid (8) facilitates cleaning and/or refilling the trap with bait. A length of string (9) (8–14 inches long) is attached inside the narrow end of the funnel (4) and dangles below the trap. The string (g) serves as a "landing platform" for the flies and as a pathway into the neck of the funnel (4) which is the entryway into the chamber (6) of the trap. The funnel entry (3) and the string (g) are at the bottom of the trap. Attachment means (10) are provided at the closed upper end of the trap for hanging the trap. A wire or piece of string (11) can be attached to the attachment means (10) for hanging the trap.

The bait inside the trap is a mixture. The ingredients and proportions of which were empirically determined by us. The recipe for the bait (7) is three parts honey, one part milk, and one part diced apple. This particular mixture has proven effective at attracting flies, It retains its attraction ability for 1–3 months and has no unpleasant aroma. The diced apple floats on the liquid giving flies a place to land where they come In contact with the sticky liquid.

In operation, flies are attracted by the scent of the halt (7), alight on the dangling string (g), crawl up the string (9) through the neck of the funnel (4) into the trap chamber (6) where they meet their doom after being immobilized by the sticky bait (7).

The invention comprises a fly trap having one or more walls which encloses a chamber, said chamber having one end closed and an entry way in the other end. Said entry way having a funnel-shape with the narrow end of the funnel toward the interior of the chamber and the wide end of the funnel joined at its perimeter to the wall of the chamber. A length of string attached to the inside of the small end of the funnel provides a place for flies to alight and crawl into said chamber. Attachment means are provided at the closed end of the chamber where you can attach a piece of wire or string to hang the trap. The inside of the funnel and wall of the chamber defining a space between them to contain a bait to attract flies. Said bait comprising a mixture of honey, milk, and diced apple in the approximate portions of three parts honey, one part milk, and one part diced apple.

The opening in the small end of the funnel (4) is 1¼ inches.

We claim:

1. A trap for catching flies, said trap comprising a cylindrical clear plastic outer shell having a lower end and an upper end, said trap further comprising a threaded lid mounted on the upper end of said outer shell and a funnel-shaped entryway mounted on the lower end of said outer shell, said entryway extending into said outer shell;

a piece of string attached to an upper portion of said entryway, said string extending from said upper portion of said entry way through said lower end of said outer shell for flies to alight on said string;

attachment means mounted to the trap adjacent the upper end of the outer shell, said attachment means for hanging the trap;

said trap further comprising a bait mixture made up of three parts honey, one part milk, and one part diced apple;

wherein a bait mixture holding space is defined between said outer shell and said funnel-shaped entryway, and said bait mixture is retained in said bait mixture holding space.

* * * * *